D. M. ROBERTSON.
Screw Blank Feeder.
No. 31,405.
Patented Feb. 12, 1861.
Fig. 1,
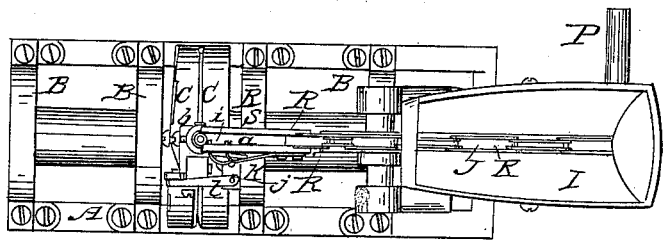
Fig. 2,
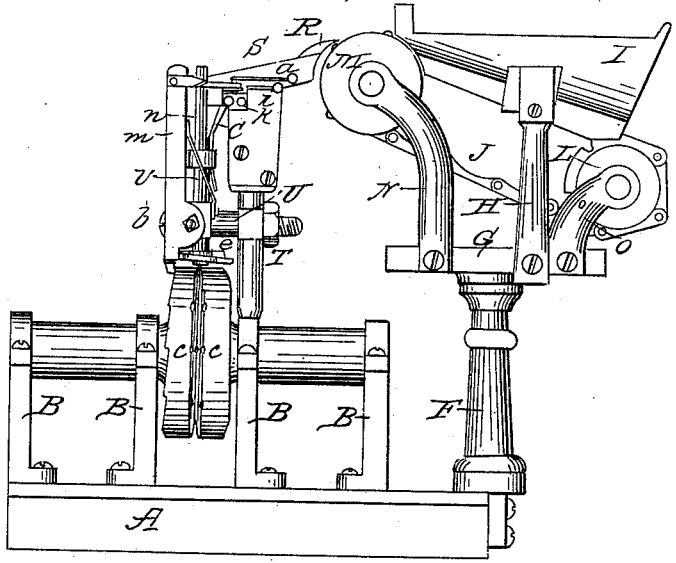
Fig. 3,
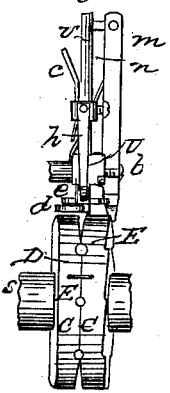
Fig. 5,
Fig. 4,
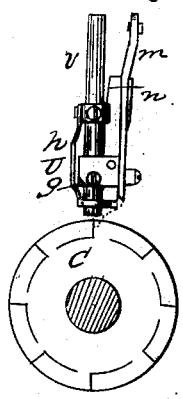
Witnesses
Fredk Souty
Wm H Bates
Inventor:
Daniel M Robertson
By his Atty J Dennis Jr

UNITED STATES PATENT OFFICE.

DANIEL M. ROBERTSON, OF MANCHESTER, NEW HAMPSHIRE.

MACHINE FOR FEEDING SCREW-BLANKS.

Specification of Letters Patent No. 31,405, dated February 12, 1861.

*To all whom it may concern:*

Be it known that I, DANIEL M. ROBERTSON, of the city of Manchester, in the county of Hillsborough and State of New Hampshire, have invented certain new and useful Improvements in Machines for Feeding Screws, Screw-Blanks, and other Articles; and I do hereby declare that the same are described and represented in the following specifications and drawings.

To enable others skilled in the art to make and use my improvements I will proceed to describe their construction and operation referring to the drawings in which the same letters indicate like parts in each of the figures.

Figure 1, is a plan or top view of a machine with my improvements. Fig. 2, is an elevation of one side of the same, Fig. 3, is the opposite side of the feeding tube.

The nature of my invention and improvements in machines for feeding screws, screw blanks and other articles consists in a hopper with a groove or slot in the bottom, through which an endless chain is arranged to traverse, provided with openings for the shafts of the screws or articles to be carried forward and fed as required. Also in same fingers and inclined planes to receive the screws from the chain or pulleys over which the chain traverses. And in a combination of devices to release the screws from the lower end of the inclined plane at the proper time and deliver them to the screws in the revolving disks.

In the accompanying drawings A, is a strong rectangular frame to which the other parts are fastened or connected.

B, B, are four stands made in the form shown and fastened to the frame A, to support the journals of the clamping disks C, C, which are made in the form shown and fitted to turn freely in the stands. These disks are connected by the dowel D, Fig. 3, so as to turn both alike, and the faces of the disks are provided with scores E, E, to receive the blanks or screws which are dropped in at the top, perpendicularly, and the journals of the disks are a little out of line one with the other or slightly on an angle, so arranged as to be open on the side shown in Fig. 2, and closed on the opposite side in Fig. 3, being partly open at the top to let the screws enter freely and close on the screws and clamp them tightly as they come to a horizontal position, where they are nicked or scored by a cutter arranged for that purpose; and as the disks are turned they separate at the lower side and the screw falls out from between the disks.

F, Fig. 2, is a stand fastened to the frame A, to support the plate G, to which plate the stands H, H, are fastened to support the hopper I, which is made in the form shown in the drawings and lowest at the right hand end, with a groove lengthwise through its bottom for the endless chain J, to travel in, which chain is made with open spaces K, between the links and travels around the sprocket wheel L, which propels it, and around the pulleys M, which has its journals in the stands N, fastened to the plate G.

The journals of the wheel L, turn in the stands O, fastened to the plate G. One of the journals of the wheel L, projects beyond the stand at P, to which a gear or pulley may be applied to turn the wheel and propel the chain. The open spaces K, in the chain are made so wide that the shafts of the screws or blanks fall into and through them, so that they hang by the head and are carried forward by the chain and agitate the mass of screws in the hopper, so that other screws fall into the succeeding spaces, and are carried up between the pulleys M, which are placed so far apart that the shaft of the screws as they hang in the chain pass freely between them, so that the screws are carried over the pulley and are caught by the fingers R, and slip down the inclined planes against the latch *i*, where they stop until the latch is drawn to let them pass. The fingers R, are hinged to the upper ends of the inclined planes S, which are placed so far apart that the shafts of the screws pass down between them. These inclined planes are made in the form shown and fastened to a stand T, which extends up from one of the stands B, as shown in Fig. 2.

The stand U, is made in the form shown and fastened in the stand T, to hold the delivering tube V, which is held in place by the set screw *b*. The tube V, is open on the side next to the inclined planes a little more than the length of the shaft of the screw, so as to let the screw pass freely into it from the inclined plane and there is an adjustable plate *c* below the inclined planes which is hollowed out, and held on the tube by a collar and set screw, to prevent the screws from falling out of or away from the tube as they drop from the inclined planes. There is a countersink at the bottom of the tube to guide the point of the screw into its place between the disks, which countersink is formed by the lower end of the tube V, and the lever $d$, see plan Fig. 5. That is the end of the tube forms a permanent countersink on the side of the tube which the head of the screw moves from, and the lever $d$, on the opposite side toward which the screw moves this lever is arranged to vibrate on a pin in the piece $c$, which is fastened to the permanent side of the tube V, and the front end is pressed against the permanent side of the tube by the spring $f$, which acts against the back end of the lever to close it, after the head of the screw leaves it, which pushes it away as it is carried out of the tube by the disks as they move forward.

To prevent any accident or injury to the machine in case the screw should catch partly in the tube and partly between the disks, I make the lower part of the tube V, over the lever $d$, in a separate piece $g$, and hinge it to the stand U, and press it against the permanent side of the tube by the spring $h$, so that if the screw stops part in the tube and the disks move it forward it will push away the piece $g$, and pass out of the tube, and the spring $h$, will press the piece $g$, back to its place again.

The latches $a$, and $i$, are springs bent at a right angle and fastened to one of the inclined planes S, so that their ends work through holes in the inclined plane to let the screws pass separately and at the proper time to pass down the tube into the scores in the disks C. These latches are operated by the rocking lever $j$, which vibrates on a pin in the stand $k$, fastened to the inclined plane S, and is operated by the link $l$, which connects it to the lever $m$, which vibrates on a screw in the stand U, and its lower end is pressed against the cam shaped teeth on the disk C, which operates it, by the spring $n$. Now as the disk C, turns, about the time the scores in the disks come under the tube V, the lever $m$, works the lever $j$, and lets the latch $a$, in before the second screw in the inclined planes so as to hold it; while the latch $i$, is drawn out from before the first screw, and it slips off of the inclined plane down the tube between the disks, and as the points of the cams pass the lever $m$, it vibrates the other way, and the latch $a$, is drawn so that the screws slip down against the latch $i$, which moved in as the latch $a$, was drawn out.

I believe I have described and represented the improvements which I have invented so as to enable any person skilled in the art to make and use them. I will now state what I desire to secure by Letters Patent, to wit—

1. An endless chain or its equivalent with openings for the screws, screw blanks or articles fed, working in a slot or groove in a hopper, so as to carry forward and feed the articles supplied to the hopper.

2. In combination with the inclined planes S, the fingers R, which receive the screws from the chain J, or pulleys M, substantially as described.

3. In combination with the cams on the disk C, the lever $m$, spring $n$, and rocking lever $j$, for the purpose of operating the latches $a$, and $i$, as required.

4. The tube V, in combination with the yielding lever $d$, or its equivalent.

5. Making one side $g$, of the tube V, to yield as described for the purpose specified.

DANIEL M. ROBERTSON.

Witnesses:
JOHN L. KELLY,
LEMUEL H. JAMES.